(12) United States Patent
van de Loecht et al.

(10) Patent No.: US 9,056,720 B2
(45) Date of Patent: Jun. 16, 2015

(54) CONVEYING DEVICE WITH ARTICULATED CONVEYING ELEMENT

(71) Applicant: Robert Bosch GmbH, Stuttgart (DE)

(72) Inventors: Heinrich van de Loecht, Muggensturm (DE); Martin Reinisch, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/374,287

(22) PCT Filed: Nov. 30, 2012

(86) PCT No.: PCT/EP2012/074043
§ 371 (c)(1),
(2) Date: Jul. 24, 2014

(87) PCT Pub. No.: WO2013/110377
PCT Pub. Date: Aug. 1, 2013

(65) Prior Publication Data
US 2015/0041288 A1    Feb. 12, 2015

(30) Foreign Application Priority Data

Jan. 24, 2012   (DE) .......................... 10 2012 200 951

(51) Int. Cl.
*B65G 17/06*   (2006.01)
*B65G 23/18*   (2006.01)
*B65G 17/32*   (2006.01)
*B65G 54/02*   (2006.01)
*B65G 17/40*   (2006.01)

(52) U.S. Cl.
CPC ................ *B65G 17/06* (2013.01); *B65G 23/18* (2013.01); *B65G 17/32* (2013.01); *B65G 54/02* (2013.01); *B65G 17/40* (2013.01)

(58) Field of Classification Search
CPC ........ B65G 17/02; B65G 17/06; B65G 17/24; B65G 17/32; B65G 17/34; B65G 17/40; B65G 23/18; B65G 23/23; B65G 35/06; B65G 39/20; B65G 54/02
USPC ........................................ 198/805
See application file for complete search history.

(56) References Cited

U.S. PATENT DOCUMENTS

| | | | |
|---|---|---|---|
| 6,876,107 B2 * | 4/2005 | Jacobs ........................ 310/12.19 |
| 6,876,896 B1 * | 4/2005 | Ortiz et al. .................... 700/112 |
| 7,422,099 B2 * | 9/2008 | Reguzzi ........................ 198/805 |
| 8,616,366 B2 * | 12/2013 | Ishino et al. .................. 198/805 |
| 8,827,071 B2 * | 9/2014 | van de Loecht .............. 198/805 |

FOREIGN PATENT DOCUMENTS

| | | |
|---|---|---|
| DE | 102010027925 | 10/2011 |
| JP | 2006052037 | 2/2006 |
| WO | 03047977 | 6/2003 |

OTHER PUBLICATIONS

International Search Report for Application No. PCT/EP2012/074043 dated Feb. 11, 2013 (English Translation, 2 pages).

\* cited by examiner

*Primary Examiner* — Leslie A Nicholson, III
*Assistant Examiner* — Keith R Campbell
(74) *Attorney, Agent, or Firm* — Michael Best & Friedrich LLP

(57) ABSTRACT

A conveying device for conveying a product, comprising a plurality of individually movable conveying elements (2, 2') for conveying the products, a stationary, circumferentially arranged guide rail (3), which defines a running path for the conveying elements (2, 2'), and a linear motor drive device (4) for driving the conveying elements (2, 2'), said conveying elements (2, 2') each having permanent magnets (5, 5') which are actively connected to the coils (6) of the linear motor drive device (4), each conveying element (2, 2') having at least one first sub-component (21) and one second sub-component (22) which are connected to one another in an articulated manner by means of a hinge (7), each sub-component (21, 22) having at least one permanent magnet (5, 5'), each conveying element (2, 2') having a reflux plate (15), and the hinge (7) being arranged on the reflux plate (15) in such a way that the reflux plate (15) is sub-divided into a first plate part (16) and a second plate part (17), which are connected to one another via the hinge (7).

18 Claims, 2 Drawing Sheets

CONVEYING DEVICE WITH ARTICULATED CONVEYING ELEMENT

BACKGROUND OF THE INVENTION

The present invention relates to a conveying device comprising a plurality of articulated, individually movable conveying elements, in particular for conveying products for a feed of packaging machines.

Conveyor systems for conveying products, in particular for use with packaging machines, are known from the prior art in various embodiments. The German patent specification DE 10 2010 027 925 A1 discloses, for example, a conveying device comprising an articulated conveying element, which can pass through very tight radii in a circumferential guide rail by the provision of hinges between individual sub-components of the conveying element. Wear and any slipping motion of the guide rollers are prevented here in the curved region. A disadvantage with this conveying device is however that an iron reflux plate has to be interrupted for design reasons due to the conveying elements which are constructed from individual sub-components that are connected to one another in an articulated manner. If, as is the case in the US patent specification U.S. Pat. No. 6,876,896 B1, a continuous iron reflux plate is used, limits are then placed on the possible radii in a circumferential guide rail so that a space requirement for this conveying device is very large. This is particularly disadvantageous in applications in the field of packaging technology.

SUMMARY OF THE INVENTION

The inventive conveying device for product conveyance has in contrast the advantage that said device, on the one hand, enables the reduction of the radii of the curved regions at a constant air gap between the arc-shaped primary parts and the permanent magnets and that, on the other hand, a common iron reflux plate is used. As a result, a targeted guidance of the magnetic flux can be provided. According to the invention, this is achieved by virtue of the fact that the conveying device comprises a plurality of individually movable conveying elements which each have at least one first sub-component and one second sub-component which are connected to one another in an articulated manner by means of a hinge. Thus, this design allows for smaller curve radii. In this case, each sub-component has at least one permanent magnet. The hinge between the sub-components is thereby arranged on a reflux plate such that the reflux plate is sub-divided into a first and a second plate part, each plate part being arranged on a sub-component of the conveying element. In so doing, the articulability of the conveying elements is maintained and the conveying elements comprise plate parts of the reflux plate connected to one another by means of hinges; thus enabling virtually a common reflux plate to be maintained during operation. As a result, the inventive reflux plate that is sub-divided in an articulated manner has approximately the same properties as a conventional, one-piece reflux plate.

In order to ensure a particularly good magnetic coupling, each sub-component of the conveying elements has two permanent magnets.

In an embodiment that is as cost-effective and simple as possible, the hinge between the plate parts of the reflux plate is formed by means of a tooth system.

A particularly cost-effective production of a conveying element according to the invention is possible if the first and the second plate part have an identical geometric shape and if, in the assembled state, the second plate part is disposed so as to be rotated by 180° about a longitudinal axis of the conveying element. As a result, the number of non-variable parts can be increased and the costs of production and assembly can be greatly reduced.

In a particularly preferred manner, the tooth system comprises first teeth which are integrally formed with the first plate part and second teeth which are integrally formed with the second plate part. The teeth are thereby preferably designed as cuboids, and an axis of articulation of the hinge runs transversely to a longitudinal axis of the teeth. In a further preferred manner, the teeth of the first and the second plate part of the reflux plate are alternately disposed in the direction of the axis of articulation. According to the invention, the tooth system can thus be formed by teeth which are disposed on the end faces of adjacent plate parts that lie opposite one another.

In a particularly preferred manner, a clearance fit is present between the teeth of adjacent plate parts in the assembled state. In this way, a sufficient movement capability of the teeth for providing the articulated function is ensured; and, on the other hand, too great a play is not present which could lead to undesired noises during the operation of the conveying element.

In order to ensure that the conveying elements run as smoothly as possible, at least one roller is preferably arranged on each sub-component of a conveying element. In a particularly preferable manner, a roller axis and the axis of articulation of the hinge coincide.

Furthermore, the conveying element preferably comprises a second hinge which is disposed between frame components of the sub-components of the conveying element. In this way, an undesirable loading of the first hinge can be prevented in the region of the tooth system between the plate parts of the reflux plate.

The inventive conveying device is preferably used in combination with packaging machines, for example with cartoners or machines/lines for secondary packaging. The inventive conveying device can also alternatively be used in assembly lines or in logistic systems for conveying piece goods.

BRIEF DESCRIPTION OF THE DRAWINGS

A preferred exemplary embodiment of the invention is described below in detail with reference to the accompanying drawings. In the drawings.

DETAILED DESCRIPTION

A conveying device 1 according to a preferred exemplary embodiment of the invention is described below in detail with reference to the FIGS. 1 to 4.

Figure 1:
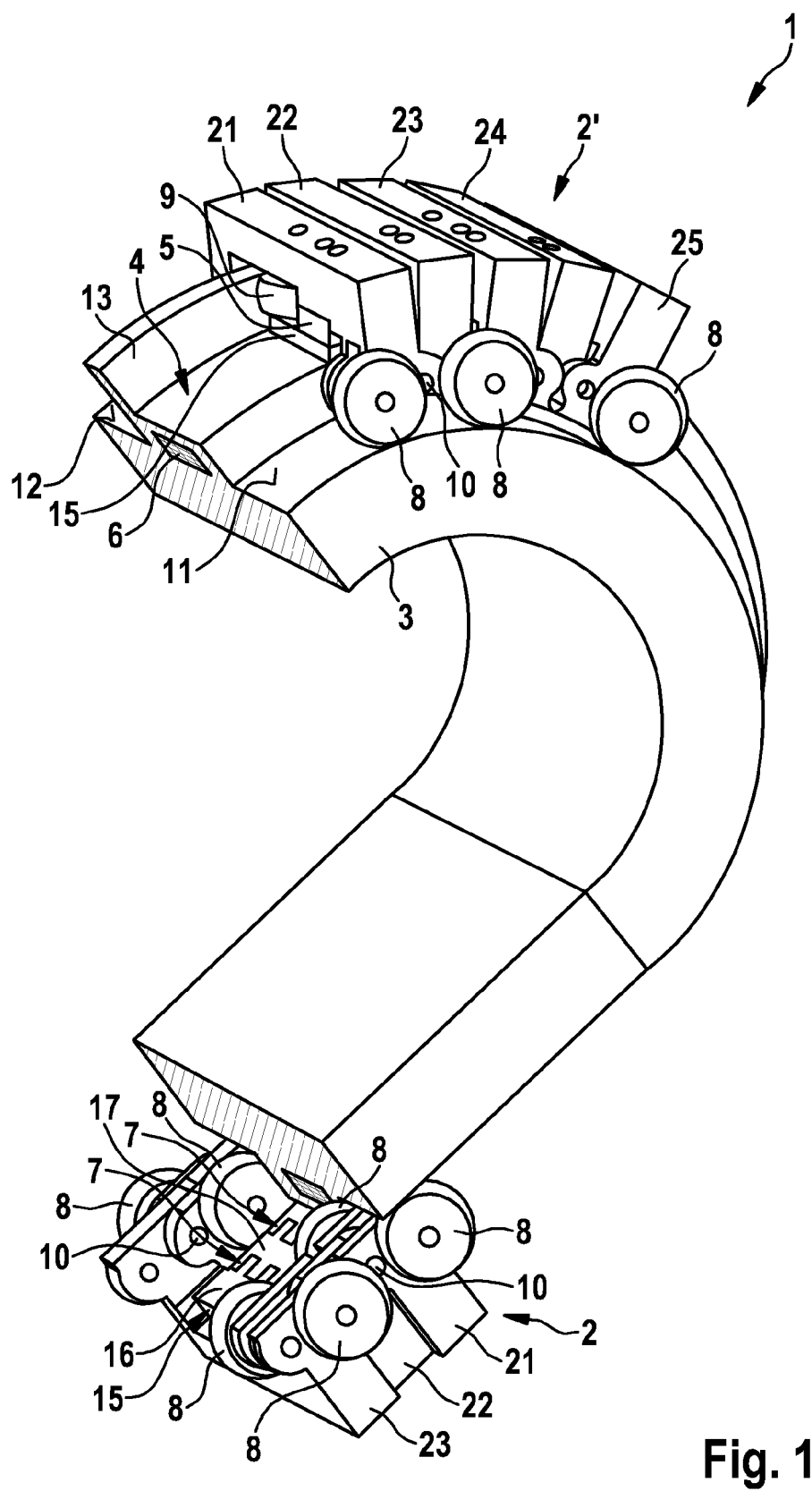
FIG. 1 shows a schematic, perspective view of conveying elements on a guide rail according to an exemplary embodiment of the invention.

As can be seen in FIG. 1, the conveying device 1 comprises a plurality of conveying elements 2, 2' as well as a stationary and circumferentially arranged guide rail 3, which is only partially depicted. The guide rail 3 has a design comprising linear partial regions as well as curved regions so that overall an oval-shaped track results. In addition, other forms of the track, e.g. angular, are possible, which are composed of modular linear and curved elements. The guide rail 3 comprises a first track 11, a second track 12 as well as a guide bar 13 located between the two tracks.

A linear motor drive device 4 is furthermore provided which comprises a plurality of coils 6 disposed in the guide rail as well as permanent magnets disposed on the conveying element 2. In this way, a conveying device comprising a plurality of conveying elements 2 that are driven independently of one another can be implemented. A travelling electromagnetic field is thereby generated by means of the coils 6, wherein the conveying elements 2, 2' follow the travelling fields by means of magnetic coupling and are therefore moved along the guide rail.

The conveying elements 2, 2' shown in FIG. 1 are basically constructed identically, but have a different number of sub-components. As can be seen in FIG. 1, the conveying element 2 has a first sub-component 21, a second sub-component 22 and a third sub-component 23. The other conveying element 2' depicted has in total five sub-components 21, 22, 23, 24 and 25.

A plurality of rollers 8 is disposed on both sides in the direction of movement of the conveying elements. In addition, guide rollers 9 are provided as a contact for the guide bar 13, the guide rollers 9, as is evident on the conveying element 2' in FIG. 1, are arranged so as to be rotated 90° with respect to the rollers 8. Furthermore, each sub-component has two permanent magnets 5, 5'.

Figure 2:
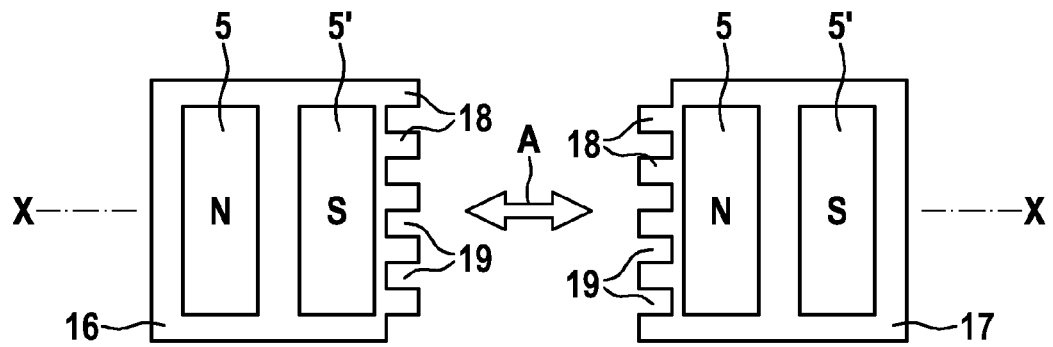
FIG. 2 shows a schematic depiction of two plate parts of a reflux plate in the unassembled state.
Figure 3:
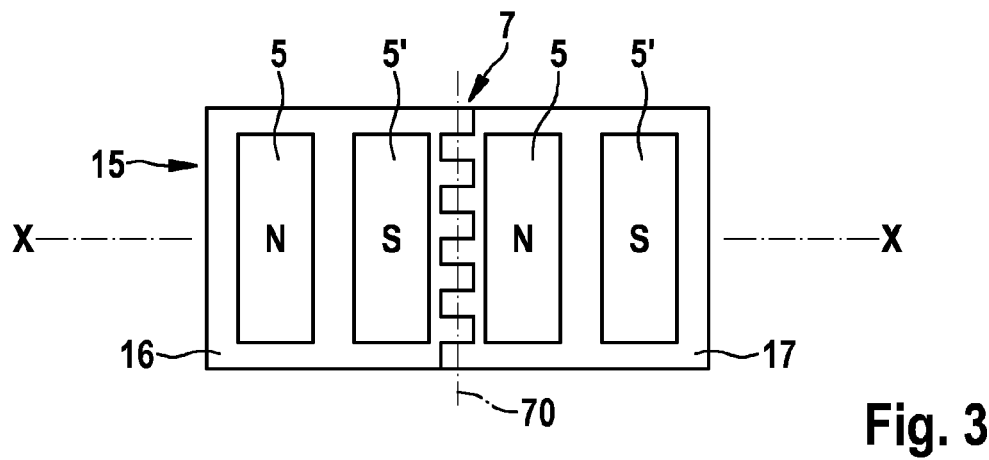
FIG. 3 shows a schematic depiction of the plate parts of the reflux plate in the assembled state.
Figure 4:
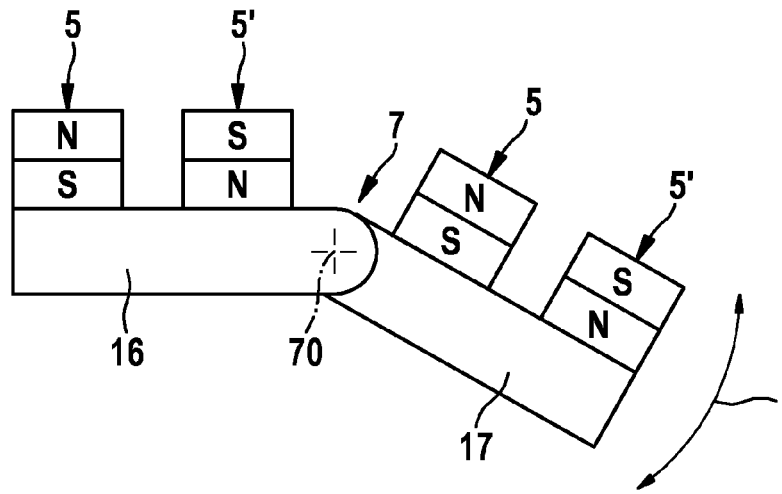
FIG. 4 shows a schematic depiction of the plate parts, which show the hinge function.

Each conveying element 2, 2' further comprises a reflux plate 15. The reflux plate 15 is composed of a plurality of plate parts 16, 17, which is schematically depicted in FIGS. 2 to 4. A plate part 16, 17 is paired here in each case with each sub-component 21, 22, 23, 24, 25 of the conveying elements 2, 2'. As is particularly apparent in FIG. 2, the plate parts 16, 17 have the same exterior shape, wherein during assembly the second plate part 17 is rotated 180° about a longitudinal axis X-X.

Each plate part comprises cuboid-shaped protruding teeth 18 having interstices 19 formed correspondingly therebetween. The teeth 18 are thereby disposed on an end face of the plate parts 16, 17. As is apparent in FIG. 2, the two plate parts 16, 17 can therefore, as indicated by the double arrow A, be pushed into one another. The pushed-together state is shown in FIG. 3. A clearance fit is thereby present between the teeth 18 of the two plate parts 16, 17, which enables an articulated connection of the two plate parts 16, 17. Thus, a hinge 7 is formed between the two plate parts 16, 17, whereby the first and the second plate part 16, 17 can pivot about an axis of articulation 70. This is indicated in FIG. 4 by the double arrow B.

In addition, a second hinge 10 is provided respectively between the sub-components 21, 22, 23, 24, 25 of the conveying elements 2, 2' (cf. FIG. 1). Said second hinge 10 particularly bears the weight of the sub-components 21, 22, 23, 24, 25 of a conveying element 2.

According to the invention, a multi-piece reflux plate 15 is therefore provided for each conveying element 2, said reflux plate comprising a plurality of plate parts 16, 17 corresponding to the number of sub-components 21, 22, 23, 24, 25. Hinges 7 are provided in each case by means of tooth systems between the plate parts; thus enabling the conveying elements 2, 2' to be capable of passing through small radii along the guide rail 3. An overlap between adjacent plate parts 16, 17 which is as large as possible can be achieved even when passing through curved regions by the inventive tooth system comprising substantially cuboid-shaped teeth 18. Hence, virtually the same strength characteristics of the reflux plate 15 can be achieved as with a conventional, one-piece reflux plate. According to the invention, an improved magnetic coupling of the plate parts 16, 17 of the reflux plate is hereby possible, wherein, due to the inventive coupling, no additional wear to the plate parts occurs. According to the invention, the magnetic flux in a conveying element 2, 2' can thus be substantially better implemented via the multi-piece reflux plate 15, and significantly smaller stray fields occur at the transition points between the plate parts 16, 17. This results in a significantly higher force for the linear motor drive device 4, wherein, due to the use of the tooth system, in particular an air gap between the two plate parts 16, 17 is also reduced to a minimum.

The invention claimed is:

1. A conveying device for conveying products, comprising:
   a plurality of individually movable conveying elements (2, 2') for conveying the products,
   a stationary, circumferentially arranged guide rail (3) which defines a running path for the conveying elements (2, 2'), and
   a linear motor drive device (4) for driving the conveying elements (2, 2'),
   said conveying elements (2, 2') each having permanent magnets (5, 5') which are actively connected to coils (6) of the linear motor drive device (4),
   each of the conveying elements (2, 2') having at least one first sub-component (21) and one second sub-component (22) which are connected to one another in an articulated manner by means of a hinge (7),
   each first or second sub-component (21, 22) having at least one permanent magnet (5, 5'),
   each of the conveying elements (2, 2') having a reflux plate (15), and
   the hinge (7) being arranged on the reflux plate (15) in such a way that the reflux plate (15) is sub-divided into a first plate part (16) and a second plate part (17), which are connected to one another via the hinge (7).

2. The conveying device according to claim 1, characterized in that at least two permanent magnets (5, 5') are arranged on each sub-component (21, 22), said permanent magnets being arranged together on a plate part (16, 17) of the reflux plate (15).

3. The conveying device according to claim 1, characterized in that the hinge (7) comprises a tooth system between the first plate art and the second plate part (16, 17) of the reflux plate (15).

4. The conveying device according to claim 1, characterized in that the first plate part and the second plate part (16, 17) have an identical geometric shape and, in an assembled state, the second plate part (17) is disposed about a longitudinal axis of the reflux plate (15) so as to be rotated by 180° with respect to the first plate part (16).

5. The conveying device according to claim 3, characterized in that the tooth system comprises a plurality of teeth (18), said teeth (18) each being integrally formed with the plate parts (16, 17) of the reflux plate.

6. The conveying device according to claim 5, characterized in that the teeth (18) are substantially configured as cuboids and teeth of the first plate part and the second plate part (16, 17) are alternately arranged in a direction of an axis of articulation (70).

7. The conveying device according to claim 5, characterized in that a clearance fit is formed between the teeth (18) of the plate parts (16, 17) in an assembled state.

8. The conveying device according to claim 1, characterized in that at least one roller (8) is arranged on each sub-component (21, 22).

9. The conveying device according to claim 8, characterized in that a roller axis of each of the rollers (8) coincides with an axis of articulation (70) of the hinge (7).

10. The conveying device according to claim 1, characterized by a second hinge (10) which is provided between the first sub-component and the second sub-component (21, 22).

11. The conveying device according to claim 2, characterized in that the hinge (7) comprises a tooth system between the first plate part and the second plate part (16, 17) of the reflux plate (15).

12. The conveying device according to claim 11, characterized in that the first plate part and the second plate part (16, 17) have an identical geometric shape and, in an assembled state, the second plate part (17) is disposed about a longitudinal axis of the reflux plate (15) so as to be rotated by 180° with respect to the first plate part (16).

13. The conveying device according to claim 12, characterized in that the tooth system comprises a plurality of teeth (18), said teeth (18) each being integrally formed with the plate parts (16, 17) of the reflux plate.

14. The conveying device according to claim 13, characterized in that the teeth (18) are substantially configured as cuboids and teeth of the first plate part and the second plate part (16, 17) are alternately arranged in a direction of an axis of articulation (70).

15. The conveying device according to claim 14, characterized in that a clearance fit is formed between the teeth (18) of the plate parts (16, 17) in an assembled state.

16. The conveying device according to claim 15, characterized in that at least one roller (8) is arranged on each sub-component (21, 22).

17. The conveying device according to claim 16, characterized in that a roller axis of each of the rollers (8) coincides with an axis of articulation (70) of the hinge (7).

18. The conveying device according to claim 17, characterized by a second hinge (10) which is provided between the first sub-component and the second sub-component (21, 22).

* * * * *